United States Patent [19]

Sugimoto

[11] Patent Number: 4,979,132
[45] Date of Patent: Dec. 18, 1990

[54] CONTROL DEVICE FOR USE WITH AN IMAGE RECORDING SYSTEM

[75] Inventor: Junichi Sugimoto, Iwatsuki, Japan

[73] Assignee: Fuji Xerox Co., Ltd., Tokyo, Japan

[21] Appl. No.: 336,206

[22] Filed: Apr. 11, 1989

[30] Foreign Application Priority Data

Jun. 24, 1988 [JP] Japan .................................. 63-156265

[51] Int. Cl.$^5$ ............................................. G06K 15/00
[52] U.S. Cl. .................................... 364/520; 364/518
[58] Field of Search ................................ 364/518–523, 364/550; 346/154; 400/50–52, 54; 355/205, 206

[56] References Cited

U.S. PATENT DOCUMENTS 4,586,147  4/1986  Tadokoro ............................ 364/550

Primary Examiner—Arthur G. Evans
Attorney, Agent, or Firm—Spensley Horn Jubas & Lubitz

[57] ABSTRACT

A control device for use with an image recording apparatus receives data indicative of a malfunction of the image recording apparatus and other data indicative of the completion of the transfer of image data for a unit set of drawings from a host computer, and then informs the host computer of the malfunction occurrence in the image recording apparatus. With such an arrangement, even when a malfunction occurs in the image recording apparatus, the graphic data for a unit set of drawings generated by the host computer, which in turn is converted into image data, may be ceaselessly transferred to and temporarily stored in an image memory in the control device. When the image recording apparatus is restored to a normal state, the control device reads out the image data drawings from the image memory, and transfers again the image data to the image recording apparatus.

5 Claims, 4 Drawing Sheets

CONTROL DEVICE FOR USE WITH AN IMAGE RECORDING SYSTEM

BACKGROUND OF THE INVENTION

The present invention generally relates to a control device in use with an image recording apparatus for visually outputting an image, and more particularly to a control device for causing an image recording apparatus to output graphic data as generated by a computer, e.g., a host computer.

The image recording apparatus, which visually outputs the graphic data (vector data) as is generated by and supplied from a computer (host computer), comes in two varieties, an electrostatic plotter and Xerography plotter. The electrostatic plotter forms an electrostatic latent image on an electrostatic recording paper, applies a subsequent developing process to the latent image to visualize it, and finally records on an ordinary paper. The Xerography plotter (referred to as an XP type plotter) forms an electrostatic latent image on a photosensitive drum, and transforms the latent image into a visible image, and finally transfers it on an ordinary paper. Some types of the image recording apparatus are provided with recording papers of different sizes which are selectively used in accordance with the sizes of output visible images. Such types of the image recording apparatus includes an XP type plotter which is provided with a plurality of trays respectively containing recording papers of different sizes.

A conventional control device for controlling the image recording apparatus, when determining that the image recording apparatus is normally operable, transfers the graphic data to the image recording apparatus, and causes it to output the graphic data (visible image). In this case, a host computer generates graphic data (vector data), and a data converting unit converts it into graphic data (raster image data) and transfers the graphic data to the control device.

When a malfunction (for example, paper jamming) occurs in the image recording apparatus, the control device detects the malfunction and informs the host computer of the trouble.

When receiving data indicating the malfunction (trouble-indicating data), the host computer immediately stops the transfer of the data to the image recording apparatus, and does not send any further data to the recording apparatus until the image recording apparatus is cured of the trouble and the host computer receives data indicating the cure from the control device.

As just mentioned, in an image recording system incorporating the conventional control device, when the control device detects a trouble (e.g., paper jamming) in the image recording apparatus, it immediately sends the trouble-indicating data to the host computer. Upon receipt of the trouble-indicating data, the host computer stops the transfer of the graphic data to the image recording apparatus.

The image recording system thus operable has such a serious problem that during a period from an instant that the control device sends the trouble-indicating data in the image recording apparatus to the host computer till the host computer receives it, the graphic data transferred from the host computer are sometimes lost, which the data is, for example, the data being currently converted to the raster image data by the data converting unit. After the malfunction is removed, the host computer starts again the supply of the succeeding graphic data to the image recording apparatus. The image recording apparatus produces a visible image on the basis of the graphic data. The visible image thus formed inevitably contains a missing part, if the data is lost.

Additionally in the conventional image recording system, the host computer must retain the graphic data, which is to be transferred, until the image recording apparatus is restored to the normal state. During this period, the host computer, therefore, cannot engage in executing of other jobs. This implies a poor utilization of the host computer.

SUMMARY OF THE INVENTION

Accordingly, an object of hte present invention is to provide a control device for an image recording apparatus which causes no image missing problem of the recorded visible image.

Another object of the present invention is to provide a control device for an image recording apparatus which allows the improvement of the utilization efficiency of a host computer used in connection with the image recording apparatus.

To achieve the above objects, there is provided a control device in use with an image recording apparatus comprising: image storing means for temporarily storing the image data of the unit set of drawings; input control means for transmitting the image data of the unit set of drawings transmitted from the data converting unit to the image recording apparatus and after detecting both an output completion information of the graphic data of the unit set of drawings transmitted from the host computer and malfunction information of the image recording apparatus, informing the host computer of the malfunction of the image recording apparatus; and output control means for detecting the malfunction of the image recording apparatus and informing the input control means of the detected malfunction and after detecting both the output completion transmitted from the host computer via the input control means and a normality information of the image recording apparatus, transmitting the image data of the unit set of drawings stored in the image means to the image recording apparatus.

Other objects, features and the like of the present invention will become apparent when carefully reading the detailed description of the invention in connection with the accompanying drawings, in which:

DETAILED DESCRIPTION OF THE PREFERRED EMBODIMENTS

Embodiments of a control device in use with an image recording apparatus according to the present invention will be described with reference to the accompanying drawings.

Figure 2:
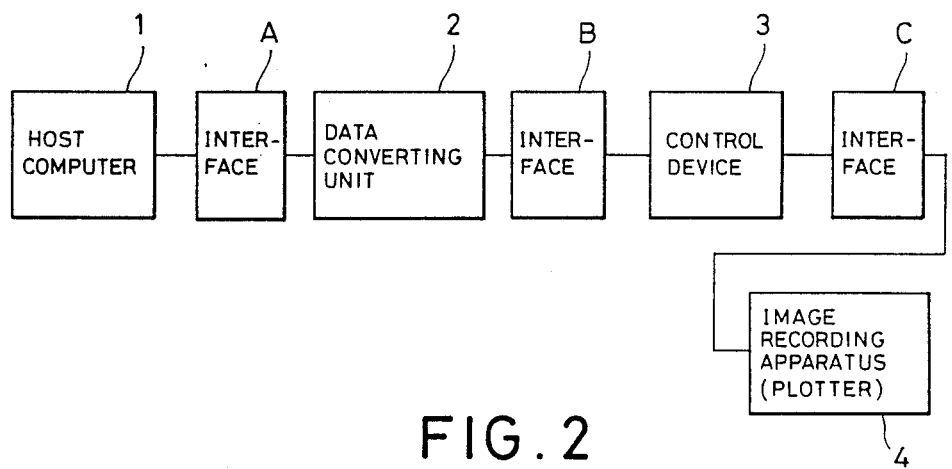
FIG. 2 is a block diagram showing an image recording system incorporating the control device of FIG. 1.

FIG. 2 shows a block diagram of an image recording system using an embodiment of a control device in use with an image recording apparatus according to the present invention. Graphic data (vector data) is generated by a host computer 1 and is transferred via a control device 3 to a data converting unit 2. In the data converting unit 2, the graphic data is converted into raster image data. The graphic data, which is now the converted raster image data, is transferred via the control device 3 to an image recording apparatus 4 or plotter, such as an XP type plotter with a plurality of trays respectively containing cut papers of different sizes. The image recording apparatus 4 records a visible image on a recording paper, on the basis of the received graphic data. In FIG. 2, reference characters A, B and C represent I/O interfaces, respectively.

Figure 1:
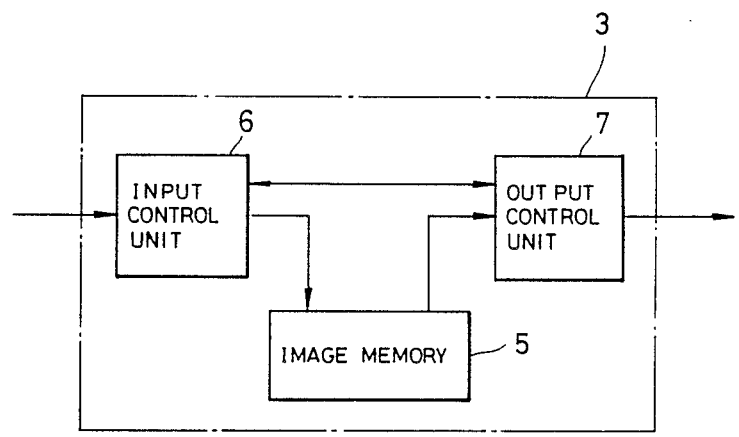
FIG. 1 is a block diagram showing a first embodiment of a control device in use with an image recording apparatus according to the present invention.

The control device 3 is arranged as shown in FIG. 1. As shown, the control device 3 is made up of an image memory 5, an input control unit 6, and an output control unit 7. The image memory 5 has a capacity of storing the image data for a unit set of drawings (referred to as unit drawings). The input control unit 6 receives the image data that is transferred through the data converting unit 2 from the host computer 1, and transfers the image data to the image memory 5. When malfunction occurs in the image recording apparatus 4, the input control unit 6 receives trouble-indicating data. After that, when transfer-end data indicating the completion of the transfer of the image data for unit drawings is received from the host computer 1, the input control unit 6 informs the host computer 1 that a malfunction in the image recording apparatus 4. The output control unit 7 detects a malfunction of the image recording apparatus 4 and informs the input control unit 6 of the malfunction of the image recording apparatus 4. At the same time, the output control unit 7 reads out the image data for the unit drawings from the image memory 5, and transfers the image data to the image recording apparatus 4.

In this embodiment, the input control unit 6 and the output control unit 7 are constructed with CPUs (central processing units) as a major component. The image memory 5 may be a RAM.

An operation of the control device 3 thus arranged will be described with reference to FIGS. 3 and 4.

Figure 3:
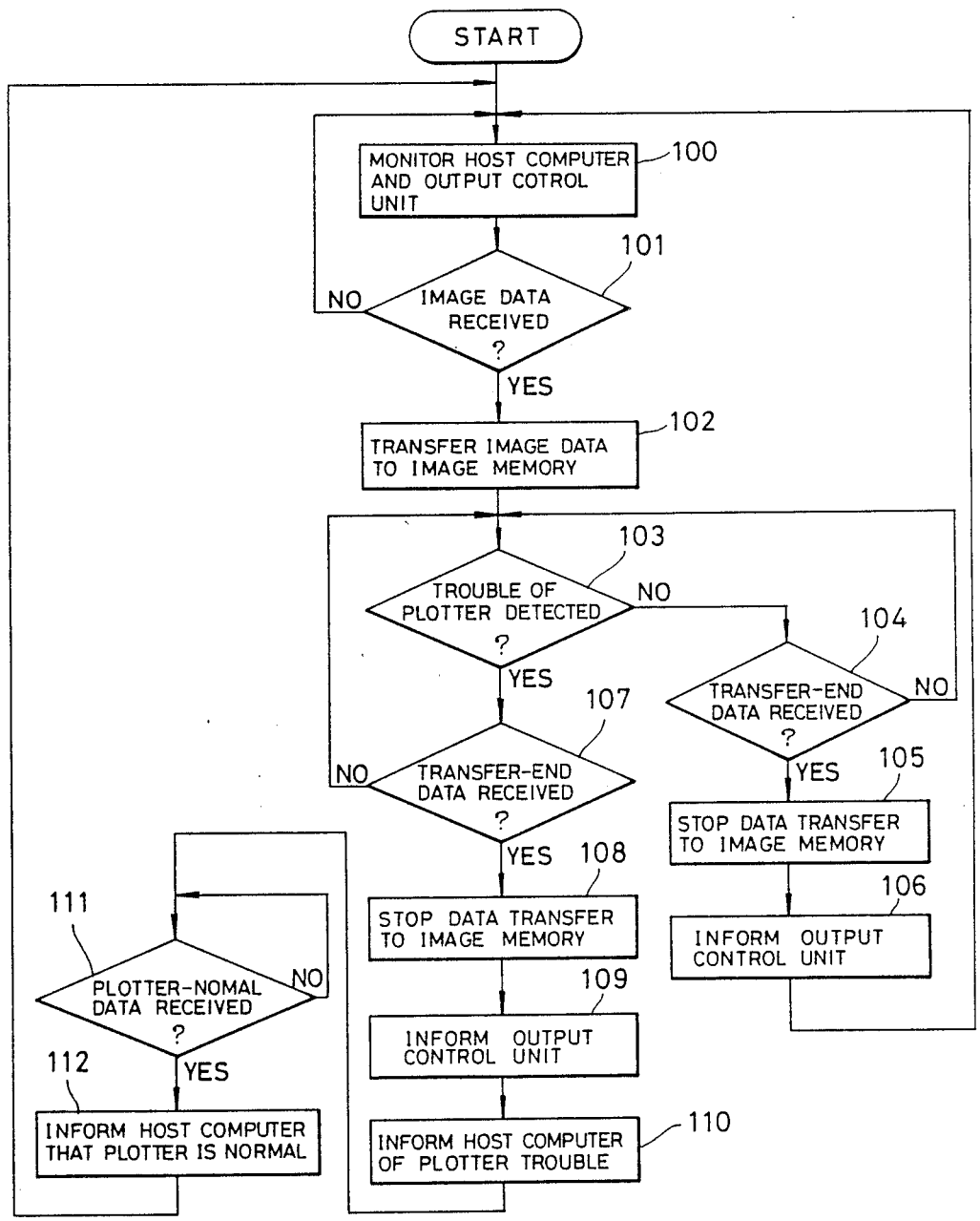
FIG. 3 shows a flowchart charting a control flow by an input control unit of the control device of FIG. 1.

FIG. 3 shows a flowchart showing a sequence of control processing steps by the input control unit 6 of the control device 3.

In FIG. 3, the input control unit 6 is placed in a monitor mode in which the input control unit is ready for receiving image data from the host computer 1 and the trouble-indicating data from the output control unit 7 (Step 100). The input control unit 6 receives the image data transferred from the data converting unit 2 (Step 101), and transfers the received image data to the image memory 5 (Step 102).

In Step 103, the input control unit 6 determines whether or not it received a trouble-indicating data from the output control unit 7. When the determination is that it did not receive the trouble-indicating data, viz., the answer is NO, it determines whether or not it received the transfer-end data from the host computer 1 (Step 104). When the determination is that it received the transfer-end data, viz., the answer is YES, the transfer of the data to the image memory 5 is stopped (Step 105). Further, the CPU in the input control unit 6 informs the output control unit 7 that the input control unit 6 received from the host computer 1, the transfer-end data. Thereafter, the input control unit 6 returns to the monitor mode monitoring the host computer 1 and the output control unit 7 (Step 100). When in Step 104, the CPU decides that the input control unit 6 did not receive the transfer-end data, the CPU repeats the job subsequent to the Step 103.

When the CPU decides in Step 103 that the input control unit 6 received the trouble-indicating data, then it decides whether or not the input control unit 6 received the transfer-end data, that is transferred from the host computer 1 (Step 107). When in Step 107, the CPU decides that the transfer-end data is received, it stops the data transfer from the input control unit 6 to the image memory 5 (Step 108). Thereafter, the input control unit 6 informs the output control unit 7 that it received the transfer-end data, (Step 109). In Step 110, the input control unit 6 informs the host computer 1 of the malfunction in the image recording apparatus 4.

Thus, after the input control unit 6 receives both the trouble-indicating data and transfer-end data, it informs the host computer 1 of the malfunction of the image recording apparatus 4. When the host computer 1 receives the trouble-indicating data from the input control unit 6, it stops the transfer of image data.

After the input control unit 6 informs the host computer 1 of the malfunction of the image recording apparatus 4 in Step 110, the CPU determines that the input control unit 6 received from the output control unit 7, data indicating that the image recording apparatus 4 has been cured of the malfunction, viz., plotter-normal data (Step 111). When the plotter-normal data was received, the input control unit 6 informs the host computer 1 that the image recording apparatus 4, is normal (Step 112). Upon receipt of the recorder-normal data from the input control unit 6, the host computer 1 starts again the transfer of the image data for the next unit drawings. Then, the input control unit 6 returns to the monitor mode monitoring the host computer 1 and the output control unit 7 (Step 100).

Figure 4:
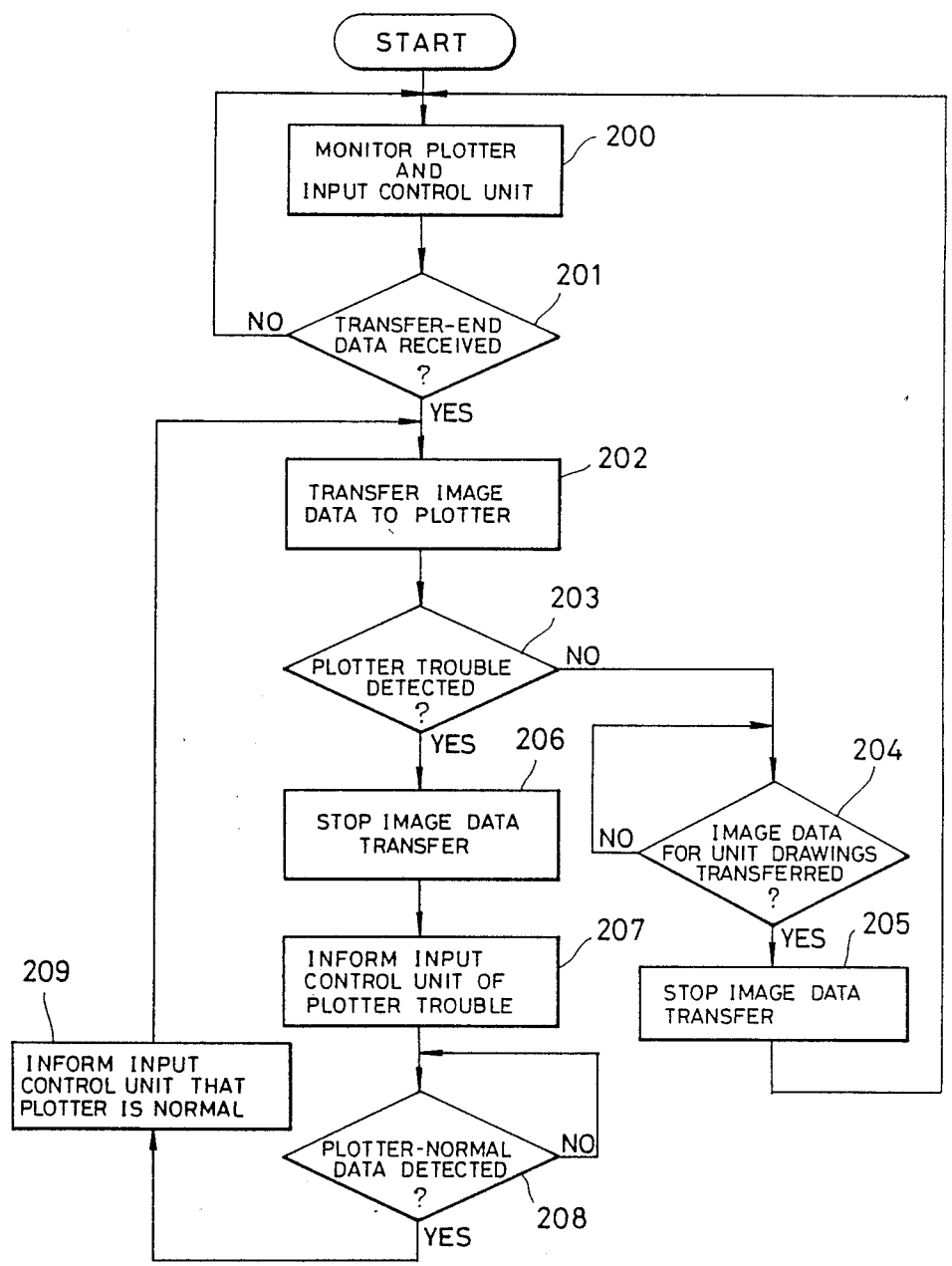
FIG. 4 shows a flowchart charting a control flow by an output control unit of the control device of FIG. 1.

A control flow by the output control unit 7 is as charted in FIG. 4. The output control unit 7 is placed in a monitor mode for monitoring the image recording apparatus 4 and the input control unit 6 (Step 200). In Step 201, the CPU in the output control unit 7 determines whether or not the output control unit 7 receives through the input control unit 6, the transfer-end data indicating that the host computer 1 completed the transfer of the image data for unit drawings. When the transfer-end data was received, the CPU reads out the image data for unit drawings from the image memory 5, and transfers the image data to the image recording apparatus 4 (Step 202). Thereafter, the output control unit 7 determines if it detected a malfunction of the image recording apparatus 4 (Step 203). When the malfunction is not detected, viz., the answer is NO, the CPU decides if the image data for unit drawings was transferred to the image recording apparatus 4 (Step 204). When the answer is YES, the CPU stops the transfer of the image data (Step 205), and then returns to the monitor mode of Step 200, which is for monitoring the image recording apparatus 4 and the input control unit 6.

When the answer in Step 203 is YES, viz., the malfunction is detected, the CPU stops the transfer of the image data (Step 206), and informs the input control unit 6 that a malfunction has occurred in the image recording apparatus 4 (Step 207). Thereafter, the output control unit 7 decides if it received data indicating that the image recording apparatus 4 is restored to a normal state, viz., the plotter-normal data (Step 208). When the answer is YES, the CPU informs the input control unit 6 that the image recording apparatus is normal (Step 209), and then the output control unit 7 repeats the job from Step 202.

As seen from the foregoing description, in the control device 3 according to the present invention, even if a malfunction occurs in the image recording apparatus 4, the host computer 1 ceaselessly transfers the image data for unit drawings to the control device 3. Therefore, the complete image data for unit drawings is stored into the image memory 5. When the image recording apparatus 4 is normally operating, the image data is read out from the image memory 5, and transferred to the image recording apparatus 4. Accordingly, a visible image as is produced by the image recording apparatus on the basis of the image data is complete, without suffering from any missing part.

Figure 5:
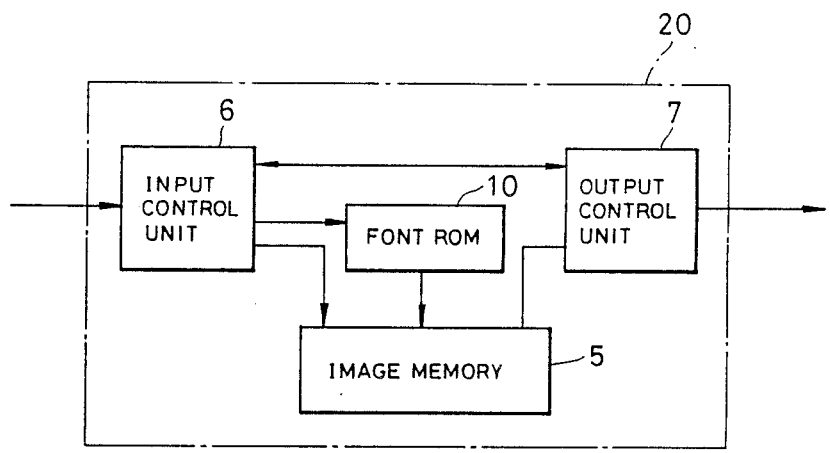
FIG. 5 is a block diagram showing a second embodiment of a control device in use with an image recording apparatus according to the present invention.

While the control device 3 is made up of the image memory 5, input control unit 6, and output control unit 7 in the foregoing embodiment, it may additionally use a font ROM 10 as shown in FIG. 5. In FIG. 5, elements which are identical to those in FIG. 1 are assigned the same reference numeral. The modified control device of FIG. 5, denoted as 20, will be described in detail. The font ROM 10 responds to an instruction by the input control unit 6, and sends an error log to the image memory 5. When the control device 20 receives from the host computer 1 the data of type that the image recording apparatus 4 cannot output, the control device 20 cause the image recording apparatus to produce an error log print in response to the instruction from the output control unit 7. Incidentally, the data that the image recording apparatus 4 cannot output is, for example, character data when the image recording apparatus 4 is not provided with a printing function for character data.

In operation, when receiving data from the host computer 1, the input control unit 6 decides whether or not the received data belongs to the type of the data which causes the input control unit 6 to issue give an instruction to the image recording apparatus 4, viz., the image recording apparatus 4 cannot output. When it decides that the received data is the type which the image recording apparatus 4 can output, the control device 20 operates tracing the control flows as shown in FIGS. 3 and 4.

Figure 6:
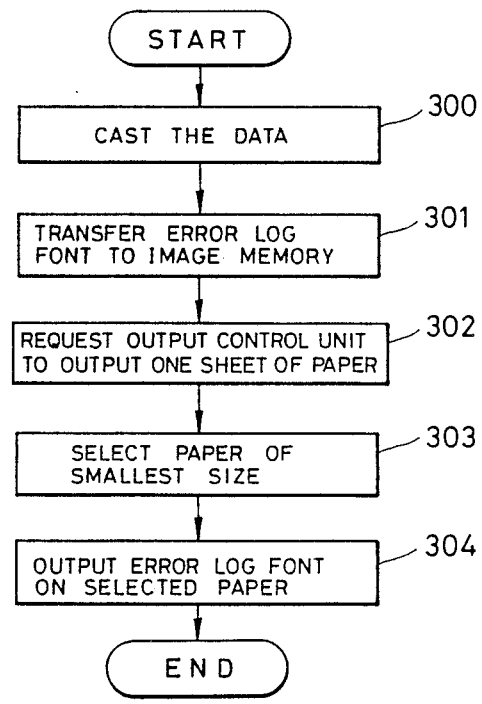
FIG. 6 is a flowchart showing a sequence of control process steps by the control device of FIG. 5.

When the input control unit 6 decides that the received data does not belong to the data of the type that the image recording apparatus 4 can output, for example, the received data is character data, the control device 20 operates as shown in FIG. 6. When making such a decision, the control device 20 treats the data transferred from the host computer 1 as error print data, and casts that data (Step 300). Then, the control device 20 reads out the data for an error log font from the font ROM 10, and transfers it to the image memory 5 (Step 301). When the transfer of the error log font data terminates, the input control unit 6 requests the output control unit 7 to output a sheet of recording paper (Step 302). The output control unit 7 receives the command requesting the output of a sheet of paper, and selects a cut paper of the smallest size from among recording papers of different sizes, which are provided in the image recording apparatus 4 (Step 303). Then, the output control unit 7 reads out the error log font data from the image memory 5, and the image recording apparatus 4 outputs the error log font on the selected paper (Step 304).

Meanwhile, when receiving the error print data such as character data from the host computer 1, the conventional control device takes one of the following two actions, to merely cast the data and does not apply any processing to the data, and to output the error log print on a paper of a preselected size. When the latter action is taken, if the preselected paper has run out in the image recording apparatus, the control device will not perform any further control operation. On the other hand, the control device 20 as mentioned above outputs the error log print regardless of the paper size, and performs the subsequent control processings ceaselessly. Therefore, even when receiving the error print data from the host computer 1, the control device 20 can ceaselessly process the job which follows the instruction from the host computer 1.

As seen from the foregoing description, in the control device in use with an image recording apparatus according to the present invention, image data for unit drawings generated by a host computer is ceaselessly transferred to the control device, even when a trouble occurs in the image recording apparatus. The data transferred is complete, without omission of any part of the data. This implies that a complete visible image is recorded by resuming the recording operation for the remaining image data when the image recording apparatus is cured of the trouble. Further, because of the above feature of the ceaseless transfer of the image data for unit drawings that is generated by and transferred from the host computer, the host computer does not need to retain the data to be transferred until the image recording apparatus is cured of trouble. Therefore, after generating the graphic data for unit drawings, the host computer may engage in executing other jobs. This improves the utilization efficiency of the host computer.

Having described the present invention in connection with specific embodiments, it should be understood that the present invention is not limited to such specific embodiments but may be variously changed and modified within the scope of the appended claims.

What is claimed is:

1. A control device for use with an image recording system, said image recording system including a host computer for generating graphic data of a unit set of drawings and a data converting unit for converting the graphic data of the set of drawings into raster image data, the control device controlling outputting of the graphic data of the unit set of drawings converted into the raster image data to an image recording apparatus, said control device comprising:

image storing means for temporarily storing the image data of the unit set of drawings;

input control means for transmitting the image data of the unit set of drawings transmitted from the data converting unit to the image recording apparatus and after detecting both an output completion information of the graphic data of the unit set of drawings transmitted from the host computer and malfunction information of the image recording apparatus, informing the host computer of the malfunction of the image recording apparatus; and output control means for detecting the malfunction of the image recording apparatus and informing the input control means of the detected malfunction and after detecting both the output completion information of the graphic data of the unit set of drawings transmitted from the host computer via the input control means and a normality of the image recording apparatus, transmitting the image data of the unit set of drawings stored in the image storing means to the image recording apparatus.

2. A control device according to claim 1, wherein said image recording apparatus is an electrostatic type plotter.

3. A control device according to claim 2, wherein said electrostatic type plotter includes a plurality of trays for containing various sizes of cut papers for various output sizes of the image data of the unit set of drawings.

4. A control device according to claim 1, wherein said image recording apparatus is a Xerography type plotter.

5. A control device according to claim 4, wherein said Xerography type plotter includes a plurality of trays for containing various sizes of cut papers for various output sizes of the image data of the unit set of drawings.

* * * * *